(No Model.)

W. J. DEVERS.
VEHICLE BRAKE.

No. 337,134. Patented Mar. 2, 1886.

WITNESSES:
C. Neveux
C. Sedgwick

INVENTOR:
W. J. Devers
BY Munn & Co.
ATTORNEYS.

UNITED STATES PATENT OFFICE.

WILLIAM J. DEVERS, OF PROVIDENCE, LACKAWANNA COUNTY, PENNSYLVANIA, ASSIGNOR TO HIMSELF, JAMES M. DEVERS, AND WILLIAM T. O'MALLEY, ALL OF SAME PLACE.

VEHICLE-BRAKE.

SPECIFICATION forming part of Letters Patent No. 337,134, dated March 2, 1886.

Application filed October 22, 1885. Serial No. 180,596. (No model.)

*To all whom it may concern:*

Be it known that I, WILLIAM J. DEVERS, of Providence, in the county of Lackawanna and State of Pennsylvania, have invented certain new and useful Improvements in Brakes for Wagons and other Vehicles, of which the following is a full, clear, and exact description.

This invention relates to brakes for barouches, coaches, and platform and other wagons or vehicles; and it consists in certain novel constructions and combinations of parts, substantially as hereinafter described, and pointed out in the claims.

The invention, while using a spring connected with a pulling attachment applied to the brake, and a crank-shaft for operating the brake arranged transversely to the body of the vehicle—such as used in other vehicle-brakes—essentially differs therefrom in other parts of the brake connected with said spring and crank-shaft that control the brake.

Reference is to be had to the accompanying drawings, forming part of this specification, in which similar letters of reference indicate corresponding parts in both the figures.

Figure 1:
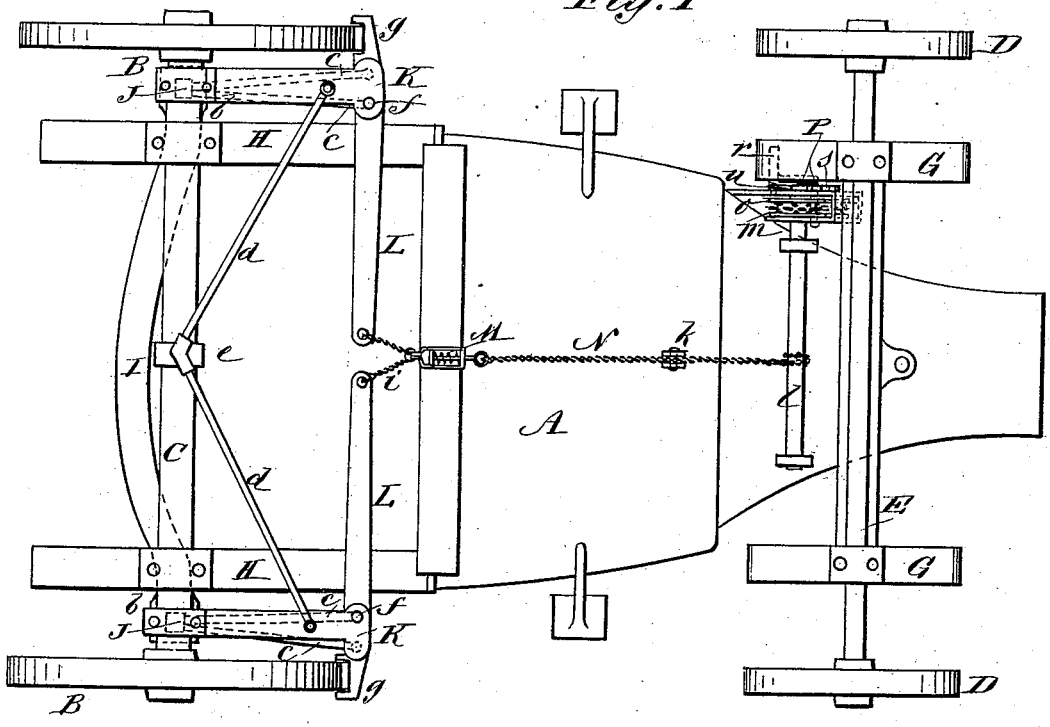
Figure 2:
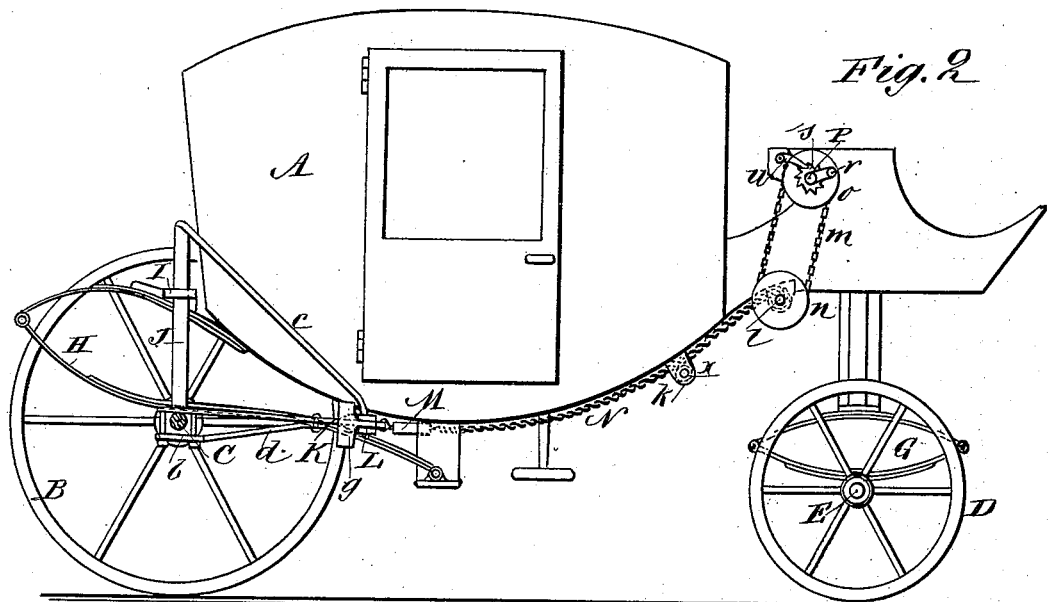

Figure 1 represents an inverted plan of a barouche with my invention applied; and Fig. 2, a side view of the same, one wheel being removed.

A indicates the body of the vehicle; B B, its hind wheels; C, its rear axle; D D, the front wheels, and E the forward axle.

G G are the springs applied to the front axle of the vehicle, and H H the springs connecting the rear axle with the body of the vehicle.

I is an upper plate connecting the two rear springs, H H, and extending beyond them. This plate has its end extensions provided with square or other shaped apertures adapted to receive through them two posts, J J, attached at their lower ends by clips *b b* to the rear axle, C, said plate and posts thus acting as guides to each other. From the upper end of each of these posts, which posts may have a suitable hinge to allow of the swaying of the body of the vehicle, and which are stationary in the up-and-down movement of the vehicle-body, are two forwardly and downwardly inclining braces, *c c*, that connect at their lower and front ends with an arm or plate, K, connected with and arranged to project in front of the rear axle at right angles, or thereabout, to it. These arms or plates K K are supported laterally by braces *d d*, connecting them through a clip, *e*, with the under side of the rear axle. The forward ends of said plates K K are or may be made of jaw-form, to provide for the attachment to them, as by intermediate pivots, *f f*, of the brake-levers L L, which carry at their outer ends the shoes or blocks *g g*, which bear against the hind wheels of the vehicle when the brake is applied.

The inner ends of the levers L L, which approach each other on opposite sides of the longitudinal center of the vehicle, are connected—as by a chain, *i*, and a spring or spring-box, M—with a central chain, N, that applies the brake. This spring M should be strong enough to withstand the strain applied to the levers, and prevent the levers from being bent or broken.

The chain N is suitably supported underneath the body of the vehicle by any desired number of guides or sheaves, *k*, and is connected at its forward end to a lower transverse shaft, *l*, beneath the forward portion of the vehicle, which shaft may either be operated direct, or be connected—as by a chain, *m*, and toothed wheels or sheaves *n o*—with an upper cross-shaft, P, having a crank or handle, *r*, within convenient reach of the driver from his seat, for the driver by turning the crank or handle to apply the brake through the instrumentality of the levers L L, when required. The upper sheave or wheel, *o*, or operating-shaft P, carrying the same, has a ratchet-wheel, *s*, with which a dog, *u*, engages to hold the brake when applied to the wheel. This dog is disengaged when it is required to release the brake.

It is proposed to apply rubber or leather washers to the pivots of the levers L on the arms, and wherever else it is necessary, to prevent rattling or clattering of the brake mechanism when the vehicle is running.

In some cases a ratchet-lever may be substituted for the handle r on the shaft P to operate the brake, especially when a rotating handle would interfere with the lamp or lantern on the vehicle.

Having thus described my invention, what I claim as new, and desire to secure by Letters Patent, is—

1. In a brake for wagons and other vehicles, the combination, with the rear axle, C, of the vehicle, its wheels B B, and rear springs, H H, of the perforated upper plate, I, connecting said springs, the posts J J, secured to said axle and in guiding connection with and through said plate, the arms or plates K K, connected with said posts and axle, and the levers L L, with their attached shoes or blocks g g, substantially as specified.

2. In a brake for wagons and other vehicles, the combination, with the arms or plates K K, the posts J J, and the axle C, of the braces c c and d, the post-guiding plate I, the springs H H, connected by said plate I, the brake-levers L L, the chain N, and the spring M, connecting said chain with the levers, essentially as shown and described.

WILLIAM J. DEVERS.

Witnesses:
E. J. LYNETT,
PAT. BYRNE.